Feb. 23, 1943.  F. C. TANNER  2,312,222
BORE GAUGE
Filed Aug. 6, 1941  2 Sheets-Sheet 1
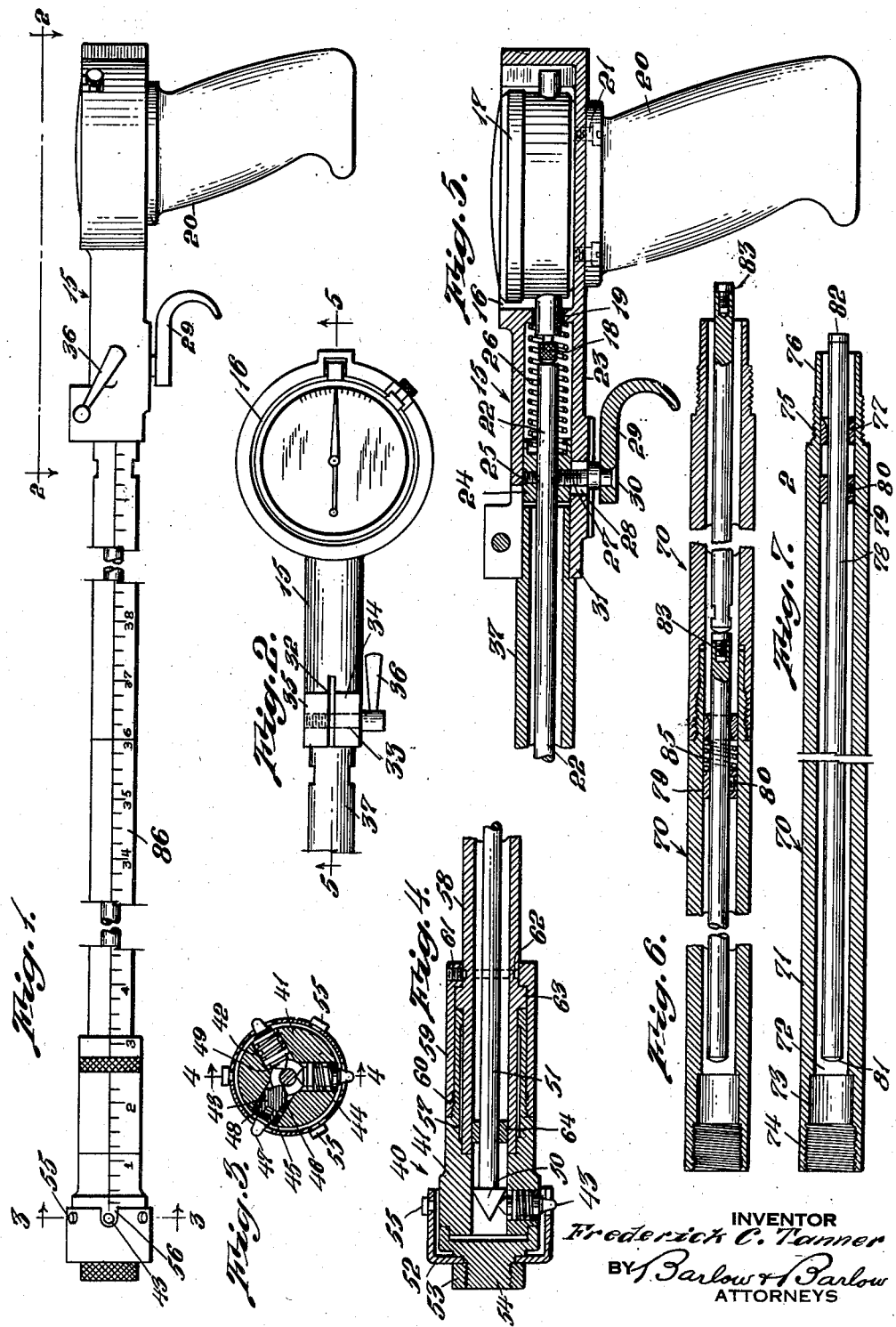
INVENTOR
*Frederick C. Tanner*
BY *Barlow & Barlow*
ATTORNEYS Feb. 23, 1943.  F. C. TANNER  2,312,222
BORE GAUGE
Filed Aug. 6, 1941  2 Sheets-Sheet 2
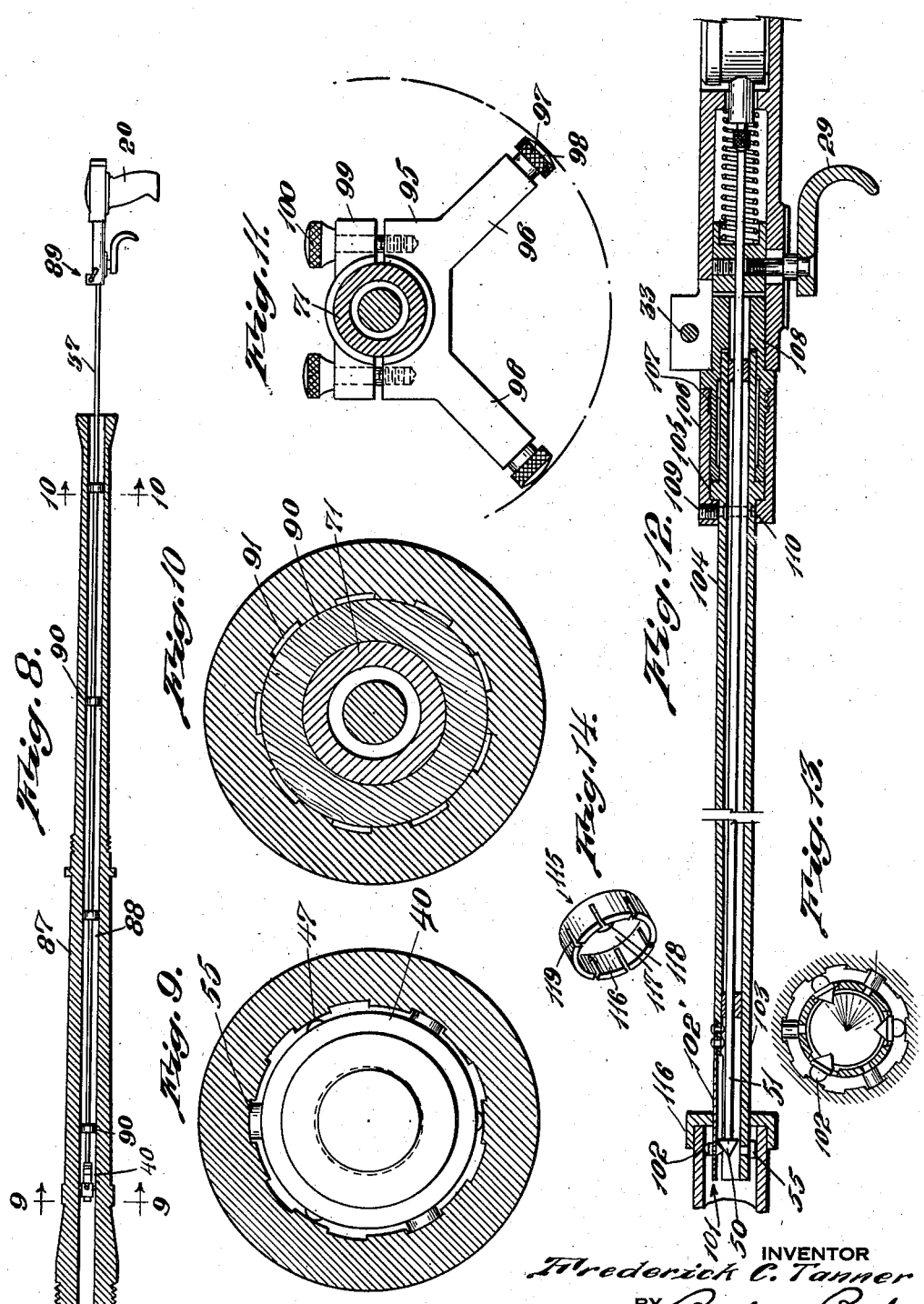
INVENTOR
Frederick C. Tanner
BY Barlow & Barlow
ATTORNEYS Patented Feb. 23, 1943

2,312,222

UNITED STATES PATENT OFFICE 2,312,222

BORE GAUGE

Frederick C. Tanner, Cranston, R. I., assignor to Federal Products Corporation, a corporation of Rhode Island Application August 6, 1941, Serial No. 405,669

7 Claims. (Cl. 33—178)

This invention relates to a micrometer gauge for a cylindrical bore in such articles as gun barrels and the like.

In the use of gauges for bores of different lengths, sections for addition or subtraction are provided to elongate or shorten the gauge for such use. Some difficulty is had in transmission of movement by the rod from the gauge head to the dial where the indication is read. This is due to friction developed, or sagging of the extensions, or various other causes.

One of the objects of this invention is to provide a gauge which may be extended for the required length by adding sections thereto without increasing the load on the permanent portion of the measuring rod so that movement of this rod may be readily accomplished even though of extended length.

Another object of the invention is to so arrange the end to end engagement of the rods that even though some out-of-line movement occurs, the measuring length of the rod will remain the same for transmission of movement.

Another object of the invention is to provide for the supporting of the extension sections so that proper alignment in the barrel may be had.

Another object of the invention is to provide for an interchangeable indicator that the measurement may be read in the desired units.

Another object of the invention is to provide for a revolving of the different parts that the spiral rifling of a barrel may be followed.

With these and other objects in view, the invention consists of certain novel features of construction, as will be more fully described, and particularly pointed out in the appended claims.

In the accompanying drawings:

Fig. 1 is a side elevation, partly broken away to illustrate the complete device of this invention;

Fig. 2 is a top plan view, viewed on substantially line 2—2 of Fig. 1;

Fig. 3 is a sectional view on substantially line 3—3 of Fig. 1;

Fig. 4 is a section on substantially line 4—4 of Fig. 3 of a fragmental end portion of the gauge;

Fig. 5 is a section on substantially line 5—5 of Fig. 2, illustrating the indicator end of the gauge;

Fig. 6 is a sectional view of two sections adjoined together;

Fig. 7 is a sectional view on a larger scale of one section;

Fig. 8 is a section of a gun barrel with the gauge positioned therein;

Fig. 9 is a section on substantially line 9—9 of Fig. 8;

Fig. 10 is a section on substantially line 10—10 of Fig. 8;

Fig. 11 illustrates a supporting device for the intermediate portions of the gauge and with reference to the supporting device of Fig. 8 is a modification;

Fig. 12 is a sectional view of a modified form of gauge in which the gauging head and extension sections revolve with reference to the indicator section;

Fig. 13 is a sectional view illustrating the gauge of Fig. 12 in the rifling barrel of the gun and in position for measuring or gauging the lands of the barrel; and Fig. 14 is a perspective view of a centralizing device shown in position on the gauge illustrated in Fig. 12.

Proceeding with this invention, I provide a plurality of extension sections which may be added intermediate the ends of the gauge as required for the length of gun barrel which is to be gauged. Each section consists of a tubular housing portion and a rod which transmits movement from a gauging head at one end to a dial indicator at the other end which remains outside of the barrel for observance by the operator. As the number of extensions increases, friction in movement of the rod in the sections increases; and in order to relieve such load and supplement the spring pressure upon the movable rod as the same becomes longer and the friction increases, I will place in each or in alternate sections, a spring to supplement this pressure. I also so mount these sections that a relative revolving may be had between the head and the dial indicator, either by revolving of the head or by revolving of the head and the extensions with reference to the indicator.

With reference to the drawings, 15 designates the body portion of a section having a circular recess 16 for the reception of a dial indicator 17 with an operating plunger 18 extending from the neck 19 thereof. A handle 20 extends from the body section being held in place by bolts 21. A rod 22 extends into the tubular portion 23 of this body and is provided with a collar 24 held in place by set screw 25 and against which spring 26 presses for urging the rod 22 away from the dial indicator. A stud 27 extends through slot 28 in this casing 15 to which a trigger 29 is attached as by riveting 30 so that the rod 22 may be moved toward the dial indicator to move it in one direction against the action of the spring. The end 31 of this casing 15 is split as at 32 and has a bolt 33 extending through ear 34 and threaded into ear 35, the same being provided with a handle 36 for pinching this split portion of the casing upon the tubular section 37 through which the rod 22 extends. In this arrangement the dial indicator is fixed with reference to the tubular section 37.

The gauging head designated generally 40 consists of a body portion 41 (see Figs. 3 and 4) bored as at 42 for the reception of feeler members 43 which are pressed outwardly by springs 44, there being three such bores for feeler fingers arranged at 120 degrees apart. Springs 44 press against the abutments 45 fixed to the body and by their pressure upon the flanges 46 and on the fingers 43 force the rounded ends 47 of the fingers inwardly. These rounded ends are detachable and are threaded as at 48 into the ends of each finger. Each of these fingers is conical as at 49 to engage the conical end 50 of the rod 51 which has axial movement and controls the position of the three feeler fingers. A cup member 52 is mounted by means of nut 53 on the portion 54 fixed to the body 41 and carries guide studs 55 which may extend into the rifling of the gun, while recesses or notches 56 provide an opening for the fingers 43 to pass through and engage the lands of the rifle bore.

A bore 57 in the body 41 receives the end of the tubular section 58 which is held in position by the sleeve 59 threaded as at 60 to the body and provided with the stud 61 engaging groove 62 in the section 58 which together with the flange 63 on the tube 58 provide for rotatable mounting of this head 40 on the end of the tubular section 58. Thus, as this instrument is inserted into the barrel of a gun, this measuring head will rotate in conformity with the pitch of the rifling as it progresses inwardly. The rod 51 is axially movable and guided through the bearing 64 in its movement with reference to the feeler fingers 43. The bearing 64, although shown in the drawing as being of a plain type of bearing, could be of any suitable anti-friction ball bearing of radial and truss construction.

The sections 37 and 58 may themselves be joined together for the functioning of the instrument; at the juncture of these sections the instrument may be separated and extensions placed in the instrument for use of the instrument in a bore of greater length. The extensions are designated generally 70, as shown in Fig. 7, and two of such extensions are coupled together in Fig. 6. Each of these extensions comprises a tubular body portion 71 provided with a bore 72 enlarged as at 73 and 74 at one end, the latter bore being threaded. At the opposite end the tube is reduced as at 75 and threaded, and further reduced as at 76. The threaded portion 75 fits the threaded portion 74 of the adjacent section, while the portion 76 fits the portion 73 of the adjacent section.

A bearing 77 for the rod 78 is provided adjacent one end which has arched surfaces to provide a single point of contact. Mounted upon this rod 78 there is a collar 79 which has a stud 80 threaded into the end engaging the rod 78. This collar is guided in the bore 72 and the sliding movement of the rod relative to the tube 71. The rod 78 is provided with a rounded surface 81 at one end and a flat surface 82 at the other end formed by a threaded headed pin 83. Thus, when the sections are coupled together, as shown in Fig. 6, the flat surface of one end engages the rounded surface of the other end of the rod of the next section so that, if the rods are out of alignment, the radius provided are still afforded accurate length measurement for transmission of axial movement.

Some friction is developed in sliding the rod 78 in the tube 71, and in order that the spring 26 need not act for the full length of the extended instrument, I have positioned a spring 85 between the guide 77 and the guide 79 so as to urge the rod 78 in the same direction as the rod 22 is urged in the fixed and permanent part of the instrument. Thus, I supplement the pressure of the spring 26 in each or in alternate extensions which are added so as to supply the necessary pressure for the operation of the rod 22 and rod 78 in its extension in transferring motion to the rod 51 which operates the feeler fingers in the measuring head. The outer surface of these extensions may be calibrated in inches as illustrated at 86 in Fig. 1 for ready determination of the depth inserted in the base.

A gun, designated generally 87, as shown in Fig. 8, has positioned therein a gauge with a plurality of extensions. In order to hold the instrument so extended centrally and axially of the bore 88, some support must be provided for the instrument so extended; and I have provided wooden rollers 90 mounted upon the periphery of the tubular section 71 as shown in Fig. 10. This wooden roller engages the lands while spanning the grooves 91 forming the rifling as shown in Fig. 10. The engagement of the guiding members 55 in the rifling is illustrated in Fig. 9, while the ends of the feeler fingers 47 are shown as engaging the lands for the measuring thereof. By changing this head, the feeler fingers may be made to enter the rifling at some of the locations while other locations of the rifling will form guides for the advancement of the head through the gun bore.

In some cases it is desirable to provide a different sort of support for the extensions; and I have illustrated in Fig. 11 such different support consisting of a body portion 95 having legs 96 with adjustable headed contact portions 97 which are curved on a radius as at 98 for their contact points and which may be adjusted axially of the arms 96. This body 95 is clamped to the extension tube 71 by means of the clamp 99 and is held in position by bolts 100. This is the type used for the larger bores, while the type shown in Figs. 8 and 10 is used in rifles of smaller bores.

In gauging the rifles of smaller bores, it is not practical to provide a construction in which only the head portion will rotate as above described, because of the small dimension of the bore being gauged; and in Fig. 12, I have illustrated a modified construction in which the tubular sections are rotatably mounted with respect to the indicator-carrying portion 15 of the gauge. In this modified construction the head portion, designated generally 101, comprises feeler members 102 each having a conical inner end engaging the conical end 50 of the rod 51, and each is secured to a flexible finger 102' suitably fixed on the section 103. Guiding members 55 are positioned directly in this section 103. The extension 104 to which the section 103 is secured is provided at one end thereof with a flange 105. A sleeve 106 having bores of different diameters rotatably receives this end portion of the extension 104, and the shoulder provided therein engages the flange 105. The opposite end of the sleeve threadingly engages the body portion 108 as at 107, and a threaded stud 109 extends through the sleeve and enters the groove 110 provided in the extension 104. The end portion of the part 108 is received and secured to the part 15 by means of the clamp bolt 33, as above described.

It will be apparent that the trigger 29 is pulled toward the handle 20 to permit the flexible fingers to contract to normal position, and then the trigger may be released to cause engagement of the conical end 50 with the conical ends of the feeler members 102 and move the same outwardly to engage the portions of the gun which they are to either measure or check. Movement of the instrument along the gun barrel will denote any variations in the diameter of the portions engaged that the uniformity of the diameter of the barrel may be observed throughout its entire length.

It has been found desirable in some instances, especially in the case in which the gauge is of relatively great length, to provide a guide and centralizing device in addition to the guiding supports above described. This guide in the present instance consists of a cup-like element, generally designated 115, having a wall 116 and a bottom wall 117 provided with an aperture 118 therein of a dimension to slidably receive the sections forming part of the gauge, as shown in Fig. 12. The wall 116 is provided with a series of slits 119 to make this wall resilient so that it may be positioned and resiliently held positioned about the end portion of the article the bore of which is being measured. It will be apparent that this provides an additional guide-like centralizing bearing which will materially aid in guiding the gauge into the bore at the beginning of the measuring thereof.

I claim:

1. In a bore gauge having a plurality of sections with a dial indicator carried by a section at one end and a contact head carried by a section at the other end in combination with extension sections, each extension section comprising a tube with a rod slidably mounted therein, means for guiding said rod in said tube, resilient means in some of said extension sections urging said rods axially in a direction to engage each other, and means to revolvably mount the head with reference to the dial.

2. In a bore gauge having a plurality of sections with a dial indicator carried by a section at one end and a contact head carried by a section at the other end in combination with extension sections, each extension section comprising a tube with a rod movably mounted therein, means for guiding said rod in said tube, resilient means in some of said extension sections urging said rods axially toward said contact head and into engagement with the rod of the adjacent section, and means to revolvably mount the head with reference to the extension sections.

3. In a bore gauge having a plurality of sections with a dial indicator carried by a section at one end and a contact head carried by a section at the other end in combination with extension sections, each extension section comprising a tube with a rod movably mounted therein, means for guiding said rod in said tube, resilient means in some of said extension sections urging said rods axilly toward the contact head and into engagement with each other, and means to revolvably mount the head and extension sections, with reference to the dial indicator.

4. In a bore gauge having a plurality of sections with a dial indicator carried by a section at one end and a contact head carried by a section at the other end, means for coupling said sections together, a rod movably mounted in said sections, resilient means urging said rod axially in one direction, and means carried by one of said sections and movable relative thereto positioned to engage the outer side of the article to be measured to centralize and aid in guiding said section through the bore being measured.

5. In a bore gauge having a plurality of sections with a dial indicator carried by a section at one end and a contact head carried by a section at the other end in combination with extension sections, each extension section comprising a tube, externally threaded at one end and internally threaded at the opposite end and with a rod movably mounted therein, a guide bearing in said tube for guiding said rod therein, said rod having an abutment thereon at a location inwardly of said guide bearing when said rod and tube are in assembled relation, and resilient means in some of said extension sections positioned between said abutment and said guide bearing for urging said rod axially in one direction, said extension sections being substantially duplicates for addition of the number required to provide the extent of gauge desired.

6. In a bore gauge having a plurality of sections with a dial indicator carried by a section at one end and a contact head carried by a section at the other end in combination with extension sections, each extension section comprising a tube with a rod movably mounted therein of a length to extend a substantial distance short of one end of the tube, a bearing fixed in said tube for slidably guiding said rod, abutment means on said rod slidably engaging said tube, and a spring positioned between some of said bearings and abutments and urging them apart to axially move the rod in the tube towards the contact head and in engagement with the rod of the adjacent section.

7. In a bore gauge having a plurality of sections with a dial indicator carried by a section at one end and a contact head carried by a section at the other end in combination with extension sections, each extension section comprising a tube with a rod movably mounted therein, a bearing in said tube having an arched surface receiving said rod for guiding the same in said tube, resilient means in some of said extension sections urging said rod axially in one direction, and means to support the extension sections.

FREDERICK C. TANNER.